Feb. 9, 1937. L. W. CHILD 2,069,816
AIR CONDITIONER
Filed July 19, 1935 2 Sheets-Sheet 1
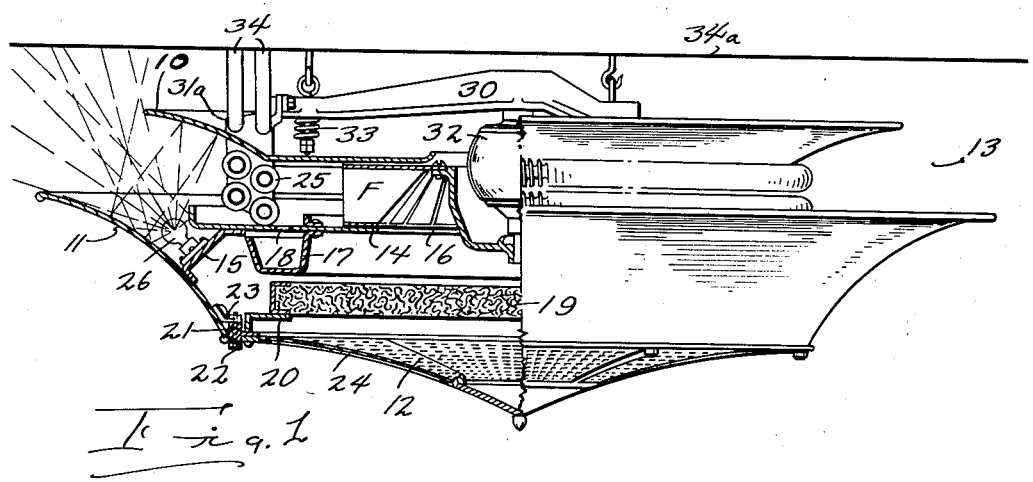
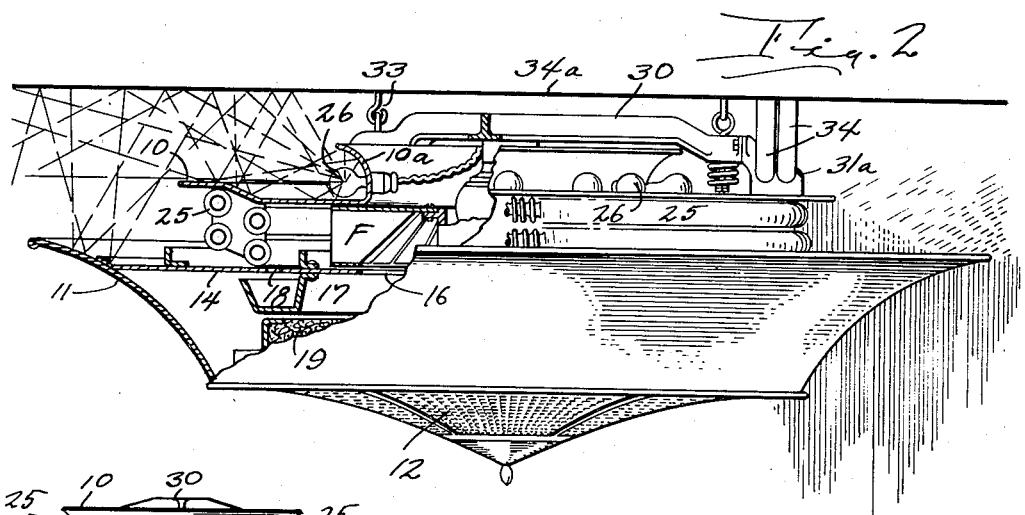
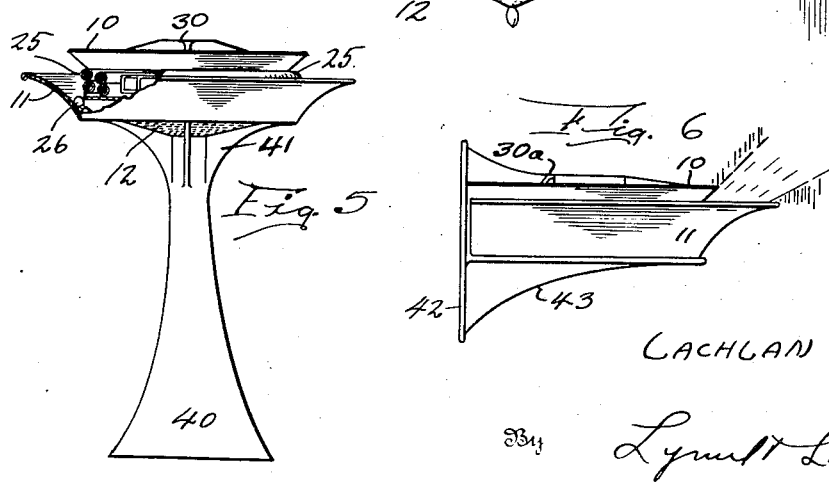
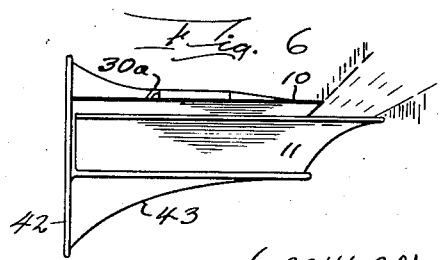
Inventor
LACHLAN W. CHILD
By Lynn H Latta
Attorney Feb. 9, 1937.  L. W. CHILD  2,069,816
AIR CONDITIONER
Filed July 19, 1935   2 Sheets-Sheet 2

Inventor
LACHLAN W. CHILD
By Lynn N. Latta
Attorney

Patented Feb. 9, 1937

2,069,816

UNITED STATES PATENT OFFICE 2,069,816

AIR CONDITIONER

Lachlan W. Child, South Bend, Ind., assignor, by mesne assignments, to Air Devices Corporation, Chicago, Ill., a corporation of Delaware Application July 19, 1935, Serial No. 32,256

16 Claims. (Cl. 257—244)

This invention relates to air conditioners of the type covered by my pending application Serial No. 732,411 filed June 26, 1934, which has matured into Patent No. 2,044,832, June 23, 1936, of which the present application is a continuation in part, and has for its object to provide an air conditioner adapted for maximum contribution to the comfort of a room equipped with the invention. To this end, it embodies a unit for modifying the temperature of, and illuminating, the space within the room, positioned above the space to be conditioned, with its parts arranged substantially symmetrically around a vertical axis, whereby it may deliver cooled air in all directions radiating substantially horizontally from said axis, above the space to be conditioned.

It is aimed to take advantage of convective action between the cooled air and the uncooled air in a room, to the point of highest efficiency, this being accomplished by the aforesaid delivery of the cooled air currents in substantially horizontal radiating directions from a somewhat centralized locus, to form a blanket of cool air which sinks downwardly, at a distance from said locus, pushing ahead of it the uncooled air which moves inwardly to a region below the unit from which it ascends to the intake of the unit, the latter being located below the marginal outlet so there will be no crossing of air currents. Simultaneously I aim to achieve a lighting effect which whether functioning according to direct or indirect lighting principles, (either of which may be attained in the present invention) will embody a most efficient and highly satisfactory diffusion of light to the same room. To this end, the invention contemplates the use of a casing or hood arrangement having the vertical axis and symmetrical features above mentioned, whereby it forms the means both for directing the cooled air currents in horizontally radiating directions, (or with a slight upward deflection to increase the distance of "carry" before settling downwardly to displace the warmer air below) and for similarly or otherwise directing light rays in outwardly radiating directions (and preferably with an upward inclination also, for ceiling impingement).

I find that a casing design which best fulfills the function of the above described diffusion of cooled air currents, also serves admirably as a light reflector, adapted to diffuse the light rays so as to secure the most efficient illumination of a room, particularly where indirect lighting is to be achieved.

The invention further aims to solve the problem, encountered in connection with the general invention here involved, of conflict between the cooling mechanism and the lighting means. That is, it is an object to arrange the lighting mechanism so that it does not cut down the output of the cooling mechanism.

With these and other objects in view my invention consists in the combination and construction and arrangement of the various parts thereof, whereby the objects contemplated are attained, as more fully set forth in the accompanying specifications, pointed out in the claims, and illustrated in the accompanying drawings, in which:

Fig. 1 is a side elevation, partly in section of one embodiment of the invention.

Fig. 2 is a similar view of another form of the invention.

Fig. 5 is a view of a pedestal type unit embodying the invention.

Fig. 6 is a view of a wall hung unit embodying the invention.

Figure 3:
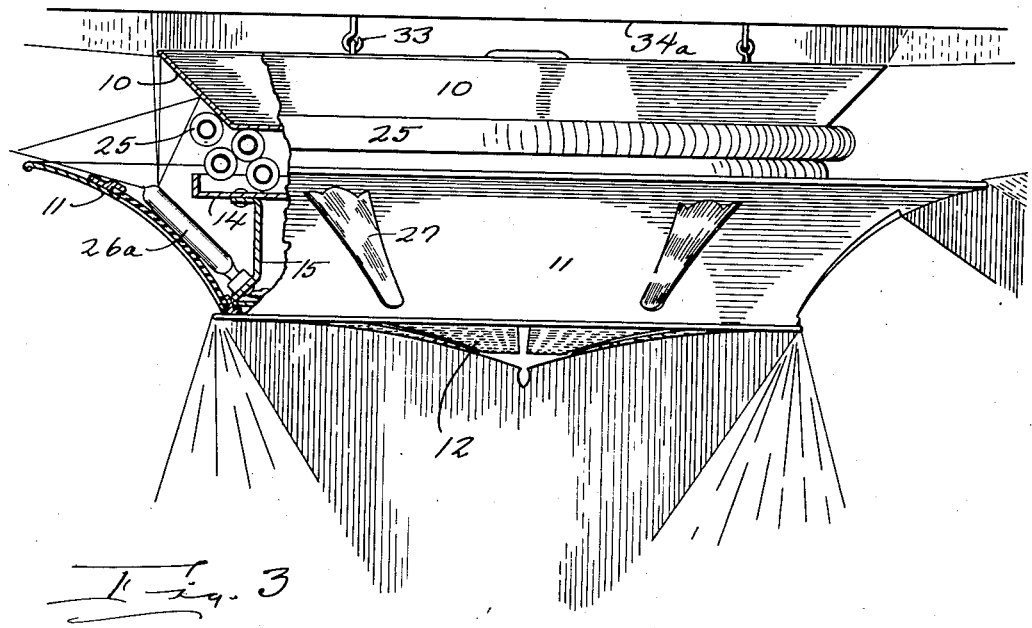
Fig. 3 is a similar view of another form of the invention.

The invention provides a casing including upper and lower casing members 10 and 11 respectively forming between them an annular conical air passage terminating at one extremity in the bottom inlet 12 which is covered by a grille 24 and at its other extremity in the peripheral outlet 13.

An annular drip eave 14 is supported on a trunco conical skirt 15 secured to the lower casing member 11, and is extended inwardly to form a shroud having an opening 16 registering with the intake of the fan F.

Below the eave 14 is a condensate trough 17, which receives condensate collected by the eave 14 and escaping through the holes 18 therein.

A filter 19 is positioned just below the trough 17, substantially traversing the span thereof. The filter 19 rests upon a frame 20 which in turn rests upon a ring 21 secured by screws 22 to brackets 23. A grille 24 is secured to the ring 21.

The annular heat transfer element 25 traverses the space between the eave 14 and the upper casing member 10.

The outer regions of the members 10 and 11 are inclined upwardly so as to deflect upwardly the air delivered by the fan F and the member 11 is generally in the form of a downwardly dished bowl.

The lighting means in this case comprises a series of electric lamps 26 arranged around the periphery of the skirt 15 and supported thereon. These lamps are positioned below the path of the conditioned air issuing from the conditioner so as to minimize their heating effect, which detracts from the cooling effect of the element 25, here illustrated as a finned cooling coil.

The casing members 11 and 10 cooperate to reflect the light upwardly and outwardly, whereby a well distributed indirect lighting effect (reflection from the ceiling) is obtained.

In order to completely eliminate heating effect of the lamps, they may be positioned above the upper casing member 10 (Fig. 2) and utilize the upper surface of the latter as a means for reflecting their rays against the ceiling.

The casing member 10 in this case may include a reflector collar 10a to distribute a large portion of the rays radially outwardly.

In Fig. 3, I have shown a modification in which a combination of direct and indirect lighting is obtained. The lamps 26a, positioned about as in Fig. 1, deliver light upwardly between the casing members 10 and 11, and downwardly through windows 27 in the lower casing member 11.

Figure 4:
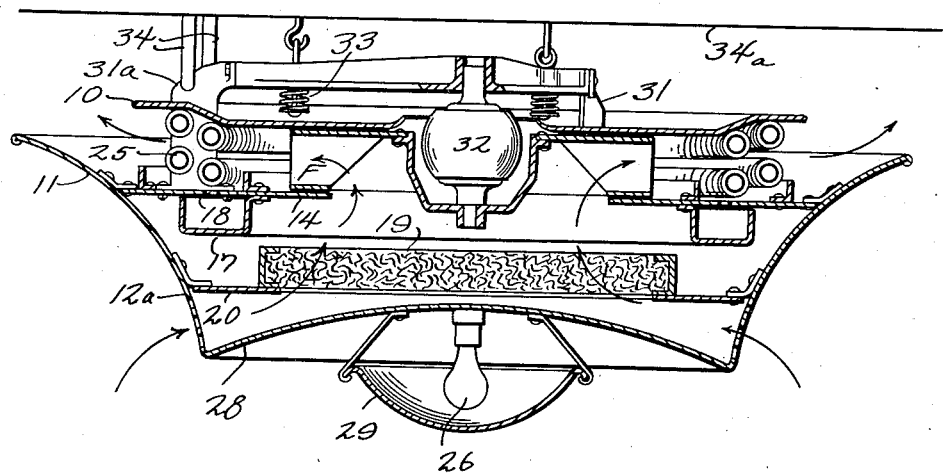
Fig. 4 is a vertical sectional view of another embodiment of the invention.

In the form shown in Fig. 4, a lamp 26 is positioned centrally below the upwardly concaved bottom 28 of the lower casing member 11 the inlet grille 12a in this case being higher up as shown. The lower face of the bottom 28 serves as a reflector. A lamp shade 29 may also be used to diffuse the direct downward rays of the lamp.

The fixture may be supported in any suitable manner, as by means of the spider 30 having arms the ends of which are attached to brackets 31 and 31a secured at their lower ends to the eave 14. The fan motor 32 is hung from the hub of the spider 30. Resilient suspensions 33 connect the spider to the ceiling 34a.

The bracket 31a serves as a header to convey fluid from one of the tubes 34 to the element 25 and back to the other tube 34, the latter being connected to a remote source of refrigeration or heat.

It will be noted that I have provided a fixture in which a dished housing is preferably adapted both for distributing conditioned air radially just beneath a ceiling, and reflecting light rays from lamps carried by it, upwardly and radially outwardly against the ceiling so as to obtain a most efficient and complete indirect lighting effect.

It will be understood that the invention may be embodied either in a ceiling hung unit, as illustrated in Figs. 1-4 inclusive, or in a pedestal type unit as shown in Fig. 5 wherein the mechanism is supported on a pedestal 40 terminating at its upper end in arms 41 carrying the support to the bottom of the casing 11.

Another form of the invention is embodied in the wall hung unit shown in Fig. 6, wherein a wall bracket 42 has the arm 43 supporting the casing 11 from below, and an arm 30a carrying the motor fan tempering element assembly from above.

I claim:

1. In an air conditioner, a fan, a heat transfer element through which air handled by said fan is passed, and a condensate collecting trough below said element, all coaxially positioned on a vertical axis above the space to be conditioned, and lighting means carried by said conditioner and arranged symmetrically to said axis.

2. A combined air conditioner and lighting fixture comprising an upwardly and outwardly flaring casing having in its bottom a re-entrant domed portion, a fan mounted in said casing coaxially therewith, a heat transfer element mounted in said casing in the path of air handled by said fan, and a light source mounted beneath and within said domed portion, the latter serving as a reflector to cast the light rays from said source downwardly.

3. A space conditioning fixture, suspended over a space to be conditioned, comprising a downwardly dished casing, air conditioning and air moving means carried therein, for producing a stream of conditioned air which is distributed in an annular, radially outwardly spreading stream by said casing, and lighting means carried by said casing, positioned so that the rays of light produced thereby will be reflected upwardly and radially outwardly.

4. A space conditioning fixture, positioned over a space to be conditioned including a casing, means carried by said casing for circulating air from the space through the casing for conditioning the air in said space, and means carried by said casing for distributing light to said space.

5. A space conditioning fixture positioned over a space to be conditioned, comprising a casing and air conditioning and lighting means carried thereby, a fan carried by the casing for circulating air from the space through the casing, all symmetrically arranged around a common vertical axis.

6. A space conditioning fixture positioned over a space to be conditioned, comprising a casing and air conditioning and lighting means and air circulating means carried thereby, all symmetrically arranged around a common vertical axis and adapted to distribute conditioned air and light in all directions radially from said axis.

7. A space conditioning fixture, suspended over a space to be conditioned, comprising a casing, means therein to circulate air from the space through the casing for conditioning the air in said space and distributing it radially from said casing, and means carried by said casing for distributing light to the said space.

8. A space conditioner as claimed in claim 5, wherein the casing is in the form of a downwardly dished bowl having an air inlet in its lower region.

9. A space conditioner as claimed in claim 5, wherein the casing comprises upper and lower casing members the lower of which is in the form of a downwardly dished bowl having an air inlet in its lower region, an air outlet being formed between said members.

10. A space conditioner as claimed in claim 5, wherein the casing comprises upper and lower casing members the lower of which is in the form of a downwardly dished bowl having an air inlet in its lower region, an air outlet being formed between said members and the lighting means being positioned between said members near said outlet, the inner surfaces of said members serving as light reflectors.

11. A space conditioner as claimed in claim 5, wherein the casing comprises upper and lower casing members the lower of which is in the form of a downwardly dished bowl having an air inlet in its lower region, an air outlet being formed between said members and the lighting means being positioned between said members near said outlet and below the path of conditioned air emerging through said outlet, the inner surfaces of said members serving as light reflectors.

12. A space conditioner as claimed in claim 5, wherein the casing comprises upper and lower casing members the lower of which is in the form of a downwardly dished bowl having an air inlet in its lower region, an air outlet being formed between said members and the lighting means being positioned above said upper casing member so as not to affect the stream of conditioned air emerging from said outlet.

13. A space conditioner as claimed in claim 5, wherein the casing comprises upper and lower casing members the lower of which is in the form of a downwardly dished bowl having an air inlet in its lower region, an air outlet having formed between said members and the lighting means being positioned below the bottom of said lower members, the under surface of the latter serving as a light reflector.

14. A space conditioner as claimed in claim 5, wherein the casing comprises upper and lower casing members the lower of which is in the form of a downwardly dished bowl having an air inlet in its lower region, an air outlet being formed between said members, said lower casing member having windows in its side wall and the lighting means being positioned inside said casing to shine through said windows.

15. In an air conditioner, an annular casing suspended over the space to be conditioned, a grille in the open bottom thereof, detachably secured thereto for downward removal therefrom while the casing remains suspended, and a filter within the casing, supported on said grille and removable therewith.

16. In an air conditioner, an annular casing, positioned on a vertical axis above the space to be conditioned, an annular horizontal wall member in said casing, having a central opening, a centrifugal fan arranged just above said wall with its eye registering with said opening, an annular cooling coil encircling the periphery of said fan, said wall serving both as a shroud for said fan and as an eave to catch condensate drip from said coil, and being apertured beneath said coil, and an annular condensate collecting trough beneath said wall and supported thereby, arranged to catch the condensate escaping through the apertured region of said wall.

LACHLAN W. CHILD.